United States Patent
Marchionni et al.

(10) Patent No.: US 7,365,229 B2
(45) Date of Patent: Apr. 29, 2008

(54) PEROXIDIC PERFLUOROPOLYETHERS

(75) Inventors: Giuseppe Marchionni, Milan (IT); Pier Antonio Guarda, Milan (IT)

(73) Assignee: Solvay Solexis S.p.A., Milan (IT)

( * ) Notice: Subject to any disclaimer, the term of this patent is extended or adjusted under 35 U.S.C. 154(b) by 509 days.

(21) Appl. No.: 11/063,996

(22) Filed: Feb. 24, 2005

(65) Prior Publication Data

US 2005/0192413 A1   Sep. 1, 2005

(30) Foreign Application Priority Data

Feb. 26, 2004 (IT) .......................... MI2004A0345

(51) Int. Cl.
*C07C 57/76* (2006.01)

(52) U.S. Cl. .................................... 562/850

(58) Field of Classification Search ..................... None
See application file for complete search history.

(56) References Cited

U.S. PATENT DOCUMENTS

| | | | |
|---|---|---|---|
| 3,810,874 A | 5/1974 | Mitsch et al. | |
| 3,847,978 A | 11/1974 | Sianesi et al. | |
| 4,451,646 A | 5/1984 | Sianesi et al. | |
| 4,721,795 A | 1/1988 | Caporiccio et al. | |
| 4,757,145 A | 7/1988 | Caporiccio et al. | |
| 5,354,922 A | 10/1994 | Marchionni et al. | |
| 5,466,877 A * | 11/1995 | Moore ........................ | 562/852 |
| 5,508,380 A | 4/1996 | Turri et al. | |

FOREIGN PATENT DOCUMENTS

| | | |
|---|---|---|
| EP | 0 790 270 A3 | 8/1997 |
| EP | 1 388 556 A2 | 2/2004 |
| EP | 1 388 556 A3 | 2/2004 |
| EP | 1 454 938 A1 | 9/2004 |
| EP | 1 521 118 A2 | 4/2005 |

OTHER PUBLICATIONS

Fluoroketenes VII. Synthesis and Reactivity of Trifluoromethylfluoroketene, Perfluoroacryloyl Fluoride, Perfluoromethacryloyl Fluoride, Methyl Perfluoroacrylate and Methyl Perfluoromethacrylate; David C. England et al; Journal of Fluorine Chemistry, vol. 3 (1973/1974); pp. 63-89.

The Reaction of Hexafluoropropene Oxide with Grignard Reagents; R.O'B. Watts et al; Journal of Fluorine Chemistry; vol. 29; (1973/1974); pp. 7-15.

Electrophilic Elimination of Alkyl Fluoride from Alkyl Fluoroalkenyl Ethers a New Way of Synthesizing Perfluoromethacrylic Acid Derivatives; I.L. Knunyants et al; Tetrahedron; vol. 29; pp. 595-601.

* cited by examiner

*Primary Examiner*—Paul A. Zucker
(74) *Attorney, Agent, or Firm*—Arent Fox LLP

(57) ABSTRACT

Peroxidic perfluoropolyethers having formula:

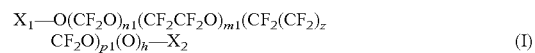

$$X_1-O(CF_2O)_{n1}(CF_2CF_2O)_{m1}(CF_2(CF_2)_z CF_2O)_{p1}(O)_h-X_2 \quad (I)$$

wherein:
$X_1$ and $X_2$, equal to or different from each other, are chain end groups selected between —$CF_2COF$ and —$COF$;
n1, m1, p1 and h are integers such that the number average molecular weight is in the range 700-100,000;
z=1 or 2;
with the proviso that:
the m1/n1 ratio is between 0.2 and 10;
the p1/(n1+m1) ratio is lower than 0.05;
the h/(n1+m1+p1) ratio is such that the PO content, defined as grams of active oxygen/100 g of compound, is in the range 0.8-4.5, preferably 1.4-3.8;
the perfluorooxyalkylene units being statistically distributed along the polymeric chain.

7 Claims, No Drawings

PEROXIDIC PERFLUOROPOLYETHERS

The present invention relates to peroxidic perfluoropolyethers containing functional end groups, the process for their preparation and the compounds obtained therefrom.

Specifically the peroxidic perfluoropolyethers are bifunctional, i.e. have functionality F equal to 2 and contain exclusively end groups of —$CF_2COF$ and —COF type.

The peroxidic perfluoropolyethers of the present invention having functionality F=2 by chemical reduction allow to prepare non peroxidic perfluoropolyethers having functionality equal to 2, useful as macromers to produce copolymers for polycondensation or polyaddition reactions with improved mechanical properties, or usable as lubricants with improved surface adhesion properties.

It is known that the peroxidic perfluoropolyethers of the prior art show, at least partly, unfunctionalized chain end groups, generally selected from —$CF_3$, —$C_2F_5$, —$C_3F_8$, —$CF_2Cl$, —$CF_2CF_2Cl$.

The peroxidic perfluoropolyethers, subjected to chemical reduction reaction, give functional perfluoropolyether derivatives. The chemical reduction reaction indeed converts every single peroxidic unit into two functional end groups. However the chemical reduction does not impart the unfunctional end groups present in the initial peroxidic perfluoropolyether and therefore said end groups remain unchanged in the functional derivative reducing the functionality degree thereof.

The average functionality F of the perfluoropolyether derivative is calculated by the following formula:

F=2×(functional end groups/total end groups).

From the formula the maximum value of the functionality equal to 2 corresponds to a mixture of macromers wherein each macromer molecule has both end groups functional. The presence of unfunctional end groups deriving from the peroxidic perfluoropolyether reduces the average functionality to values lower than 2. In said case the macromer mixture contains a part of molecules showing at least one unfunctional end group, i.e. monofunctional molecules and in a lower amount molecules having both end groups unfunctional.

The presence of these compounds is undesired when the macromer mixture is used to prepare polycondensation polymers, since they limit the molecular weight of the polymers and therefore they do not allow to obtain high mechanical properties.

U.S. Pat. No. 5,354,922 describes the synthesis of peroxidic perfluoropolyethers and of functional derivatives obtainable the—refrom. In the patent it is stated that to obtain high functionality compounds it is necessary to synthesize peroxidic perfluoropolyethers showing, with the same peroxide content, higher molecular weights. In this way the amount of unfunctional end groups in the corresponding derivative is reduced. The Examples show that it is however not possible to obtain derivatives with functionality equal to 2. From the industrial point of view the use in a plant of peroxidic raw compounds having a high molecular weight, and therefore with high viscosity, implies various inconveniences. For example difficulties arise in pumping these fluids; besides it can take place the separation of the peroxidic polymer from the reaction solvent with consequent risk of clogging of the pipes, jeopardizing the thermal exchange efficiency. Under said conditions it can easily occur the uncontrolled degradation of the peroxidic polymer.

The need was felt to have available a process to obtain peroxidic raw compounds having functionality F equal to 2, so to directly obtain, by chemical reduction, bifunctional derivatives substantially free from the corresponding monofunctional and non functional derivatives, avoiding the drawbacks of the prior art processes.

It has been unexpectedly and surprisingly found by the Applicant a process solving the above technical problem utilizing peroxidic perfluoropolyethers having functionality F equal to 2.

An object of the present invention are peroxidic perfluoropolyethers having functionality F=2 of formula:

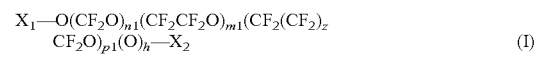

wherein:

X$_1$ and X$_2$, equal to or different from each other, are chain end groups selected between —$CF_2COF$ and —COF;

n1, m1, p1 and h are integers such that the number average molecular weight is in the range 700-100,000, preferibilmente 1,500-40,000;

z=1 or 2;

with the proviso that:

the m1/n1 ratio is between 0.2 and 10;

the p1/(n1+m1) ratio is lower than 0.05;

the h/(n1+m1+p1) ratio is such that the PO content, defined as grams of active oxygen/100 g of compound, is in the range 0.8-4.5, preferably 1.4-3.8;

the perfluorooxyalkylene units being statistically distributed along the polymeric backbone.

The peroxidic perfluoropolyethers of formula (I) have functionality 2 and can be used as polymerization initiators for preparing (per)fluoroelastomers or crystalline or partially crystalline (per)fluoropolymers. For example, as it is well known, the various types of fluoroelastomers are used in the fields wherein very good elastic properties combined with high chemical and thermal stability are required. They are copolymers based on vinylidene fluoride (VDF) and/or tetrafluoroethylene (TFE), wherein said monomers are copolymerized with other ethylenically unsaturated fluorinated monomers, as hexafluoropropene (HFP), perfluoroakylvinylethers (PAVE), chlorotrifluoroethylene (CTFE), etc, or with non fluorinated monomers with ethylene unsaturation, as ethylene and propylene. The fluoroelastomers are usually prepared by aqueous emulsion polymerization with radical initiators.

The peroxidic (per)fluoropolyethers (PFPEs) of formula (I) are mixture of compounds having different molecular weights and different end groups selected from those defined above. By fractional distillation, e.g. molecular distillation, or by extraction or chromatography separation it is possible to obtain different fractions of said compounds.

A further object of the present invention is a process for preparing peroxidic perfluoropolyethers having functionality F=2, of the following formula:

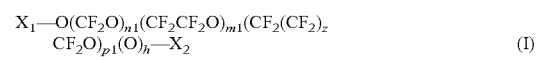

wherein:

X$_1$ and X$_2$, equal to or different from each other, are chain end groups selected between —$CF_2COF$ and —COF;

n1, m1, p1 and h are-integers such that the number average molecular weight is in the range 700-100,000, preferably 1,500-40,000;

z=1 or 2;

with the proviso that:
the m1/n1 ratio is between 0.2 and 10;
the p1/(n1+m1) ratio is lower than 0.05;
the h/(n1+m1+p1) ratio is such that the PO content, defined as grams of active oxygen/100 g of compound, is in the range 0.8-4.5, preferably 1.4-3.8;

the perfluorooxyalkylene units being statistically distributed along the polymeric chain;

said process carried out by photooxidation, in the presence of $CF_2$=CFCOF (perfluoroacryloyl fluoride, PFAF), of tetrafluoroethylene (TFE) in the presence of UV light having wave length between 200 and 350 nm, at a temperature in the range from −30° C. to −100° C., by using solvents, liquid under the reaction conditions, selected from perfluorocarbons and (mono)hydrofluorocarbons, having the following general formula:

$$C_yF_{(2y+2-x)}H_x \quad (II)$$

wherein y is an integer from 2 to 4; x is an integer equal to 0 or 1;
or related mixtures.

The process can be carried out in a semicontinuous or continuous way, by feeding in the reaction solvent TFE and oxygen in molar excess with respect to TFE, said molar ratio being for example from 1.1 up to 3, and by contemporaneously feeding PFAF, at the gaseous or liquid state, with flow rates such that the molar ratio PFAF/TFE is between 0.001 and 0.07, preferably from 0.008 to 0.05, extremes included. It has been surprisingly and unexpectedly found by the Applicant that by using the above mentioned molar ratios the PFAF does not enter the chain, not even in traces. Therefore by operating under said conditions, only peroxidic perfluoropolyethers of formula (I) are obtained, wherein the functional —COF end groups (see $X_1$ and $X_2$ in formula (I)) are present as chain end groups. If PFAF entered the chain, there would be also the formation of peroxidic perfluoropolyethers wherein the —COF end groups are prevailingly pendant from the backbone. Under these conditions the separation of these compounds from those of formula (I) would be practically impossible.

Among the solvents of formula (II) those selected from the compounds of the following group are preferred: perfluoropropane ($C_3F_8$), hydropentafluoroethane ($C_2F_5H$) and 2-hydroheptafluoropropane ($CF_3CFHCF_3$); or related mixtures.

The olefin PFAF is prepared according to well known methods of the prior art. For exemplificative purposes the following publications are mentioned: D. C. England et al., Journal of Fluorine Chemistry, Vol. 3 (1973/74), pages 63-89; R. O'B. Watts et al., Journal of Fluorine Chemistry, Vol. 3 (19-73/74), pages 7-15; I. L. Knunyants et al., Tetrahedron, Vol. 29, pages 595-601.

A further object of the present invention are bifunctional non peroxidic perfluoropolyethers, i.e. with functionality F equal to 2, obtainable by chemical reduction of the peroxidic perfluoropolyethers of formula (I), having formula:

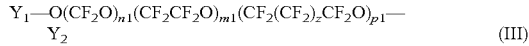

$$Y_1\text{—O}(CF_2O)_{n1}(CF_2CF_2O)_{m1}(CF_2(CF_2)_zCF_2O)_{p1}\text{—}Y_2 \quad (III)$$

wherein:
z is as above;
n1, m1 and p1 are integers such that the number average molecular weight is in the range 400-20,000, preferably 450-10,000;

with the proviso that:
the m1/n1 ratio is in the range 0.2-10;
the p1/(n1+m1) ratio is lower than 0.05;
$Y_1$ and $Y_2$ are end groups —$CF_2COX^A$, equal to or different from each other, wherein $X^A$ is F, OH, OR, wherein R is $CH_3$ or $C_2H_5$;
the perfluorooxyalkylene units being statistically distributed along the polymeric chain.

The (per)fluoropolyethers (PFPES) of formula (III) are mixture of compounds having different molecular weights and different end groups selected from those defined above. By fractional distillation, e.g. molecular distillation, or by extraction or chromatography separation it is possible to obtain different fractions of said compounds.

The chemical reduction of the compounds of formula (I) is carried out according to known processes, as described for example in patents U.S. Pat. No. 4,451,646 and U.S. Pat. No. 3,847,978. As chemical reducing agents, it can for example be mentioned: hydriodic acid; hydrogen in the presence of catalysts, as palladium on carbon; primary and secondary alcohols optionally in the presence of an aluminum alcoholate; primary and secondary alcohols in the presence of transition metal salts, for example copper or cobalt; hydrides; complex boron and aluminum hydrides; $SO_2$, $H_2S$ and the related salts with alkaline metals; hydrazine; hydroxylamine; phosphorous acid, hypophosphorous acid and their salts; iron, tin, $SnCl_2$. The reduction is carried out at temperatures in the range from −30° to 250° C. and at pressures between 1 atm and 200 atm, optionally in the presence of a solvent or of a dispersant.

A further object of the present invention are non peroxidic perfluoropolyethers with functionality F equal to 2, obtainable from the perfluoropolyoxyalkylenes of formula (II-I), by the reactions described in U.S. Pat. No. 3,810,874, U.S. Pat. No. 4,721,795, U.S. Pat. No. 4,757,145, having formula:

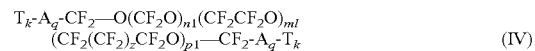

$$T_k\text{-}A_q\text{-}CF_2\text{—O}(CF_2O)_{n1}(CF_2CF_2O)_{m1}(CF_2(CF_2)_zCF_2O)_{p1}\text{—}CF_2\text{-}A_q\text{-}T_k \quad (IV)$$

wherein
A is a linking bridge bound to the end group —$CF_2$— of the pefluoropolyether chain,
T represents one or more functional groups;
k and q are integers, k ranges from 1 to 4, preferably from 1 to 2, q is an integer from 0 to 1;
z is as above;
n1, m1 and p1 are integers such that the number average molecular weight is in the range 400-20,000, preferably 450-10,000;

with the proviso that:
the m1/n1 ratio is between 0.2 and 10;
the p1/(n1+m1) ratio is lower than 0.05;

with the proviso that when q=0 and k=1, T is different from $COX^A$ as above.

A is a linking bivalent radical between the perfluoromethylene group of the fluorinated chain and the end group T. Preferably A is a linear aliphatic group —$(CH_2)_{m'}$— wherein m' is an integer from 1 to 20, or (alkylen)cycloaliphatic, (alkylen)aromatic; A can optionally contain heteroatoms in the alkylene chain or in the ring when A contains cyclic structures; A can optionally be both a linear and branched polyalkylenoxy chain, in particular containing repeating units of the $CH_2CH_2O$, $CH_2CH(CH_3)O$, $(CH_2)_3O$, $(CH_2)_4O$ type. The linking bridge A can contain amidic groups, ester, ether, COO, sulphur, imine groups.

In A the number of carbon atoms of the cycloaliphatic groups ranges from 3 to 20, preferably from 4 to 6 and that of the aromatic groups from 6 to 20; preferably from 6 to 12, the group A can optionally be formed also by combining among each other the aliphatic, cycloaliphatic and aromatic groups as above.

The linking group of A with the perfluoromethylene group of the fluorinated chain can be for example: —C—; —O—; —CONR—, wherein R has the following meanings: H, $C_1$-$C_{15}$ alkyl, $C_3$-$C_{15}$ cycloaliphatic or $C_6$-$C_{15}$ aromatic groups; —$CO_2$—; —COS—; —CO—; one heteroatom; or triazine, or heterocyclic aromatic groups having 5 or 6 atoms containing 2 or more heteroatoms, equal to or different from each other.

T is an end group which makes bi- or polyfunctional the structure, depending on the value of k. When T is a reactive chemical end group and k=1, the perfluoropolyethers of formula (IV) having functionality F=2 are used as macromers to produce polymers for polycondensation or polyaddition reactions having improved mechanical properties. When T is a reactive chemical end group and k>1 the perfluoropolyethers of formula (IV) are used as macromers to produce for example star polymers for polycondensation or polyaddition reactions with improved mechanical properties.

Said compounds of formula (IV) with reactive end groups T can be used to treat surfaces of natural and artificial substrata; paper, cotton, wood, stone materials, polymeric materials, metal or inorganic substrata can be mentioned.

When T is an unreactive chemical end group the perfluoropolyethers of formula (IV) having functionality F=2 are used as lubricants with improved surface adhesion properties.

In particular T can be for example: —SH, —SR', —NR'$_2$, —COOH, —SiR'$_d$Q$_{3-d}$, —CN, —NCO, CH=$CH_2$,

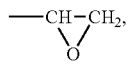

—COR', —$OSO_2CF_3$, —OCOCl, —OCN, —N(R')CN, —(O)COC(O)—, —I, —CHO, —CO, —CH($OCH_3$)$_2$, —$SO_2$Cl, —C($OCH_3$)=NH, —C($NH_2$)=NH, —CH(OH)$CH_2$OH, —CH(COOH)$_2$, —CH(COOR')$_2$, —CH($CH_2$OH)$_2$, —CH($CH_2NH_2$)$_2$, —CH(CN)$_2$, —CH($CH_2OCH_2$CH=$CH_2$)$_2$, an aromatic radical substituted with a methylendioxy group:

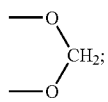

—OH, with the proviso that A is different from methylene and from a polyalkylenoxy chain as above; wherein R' is an alkyl, cycloaliphatic or aromatic group, R' optionally contains fluorine, Q is an OR' group, d is an integer between 0 and 3.

The compounds of formula (IV) are prepared from the compounds of formula (III) by known reactions, for example by using the reactants or the reaction conditions as described hereinafter.

| $A_q$–$T_k$ in formula (IV) (q = 1; k = 1) | Reactant/reaction conditions |
|---|---|
| 1 —CONH$CH_2$—CH=$CH_2$ | $H_2$NC$H_2$—CH=$CH_2$ |
| 2 —CONH($CH_2$)$_3$$CO_2$H | $H_2$N($CH_2$)$_3$$CO_2$H |
| 3 —CON($CH_3$)$CH_2$$CH_2$OH | HN($CH_3$)$CH_2$$CH_2$OH |
| 4 —CONH$CH_2$$CH_2$$NH_2$ | $H_2$NC$H_2$$CH_2$$NH_2$ |
| 5 —CONH$CH_2$$CH_2$SH | $H_2$NC$H_2$$CH_2$SH |
| 6 —CONH ($CH_2$)$_3$Si($OCH_3$)$_3$ | $H_2$N($CH_2$)$_3$Si($OCH_3$)$_3$ |
| 7 —CONH—C$_6$H$_4$—OH | $H_2$N—C$_6$H$_4$—OH |
| 8 —CONH—C$_6$H$_4$—$CH_2$$CO_2$H | $H_2$N—C$_6$H$_4$—$CH_2$$CO_2$H |
| 9 —CONH—C$_6$H$_3$(OH)$_2$ | HO—C$_6$H$_3$(OH)($NH_2$) |
| 10 —CONH—C$_6$H$_4$—Si($CH_2$)$_2$$OC_2$H$_5$ | $H_2$N—C$_6$H$_4$—Si($CH_2$)$_2$$OC_2$H$_5$ |

-continued

| $A_q$–$T_k$ in formula (IV)<br>(q = 1; k = 1) | Reactant/reaction<br>conditions |
|---|---|
| 11 —CONH—C₆H₄—CH₂CH=CH₂ | H₂N—C₆H₄—CH₂CH=CH₂ |
| 12 —CONH—C₆H₃(NCO)(CH₃) | OCN—C₆H₃(NCO)(CH₃) |
| 13 —CONH—C₆H₄—O—C₆H₄—NCO | OCN—C₆H₄—O—C₆H₄—NCO |
| 14 —CONH—C₆H₄—CH₂—C₆H₄—NCO | OCN—C₆H₄—CH₂—C₆H₄—NCO |
| 15 2-methyl-5-hydroxybenzoxazole | (1) 2-amino-1,4-dihydroxybenzene (with NH₂, OH, OH)<br>(2) Heating |
| 16 2-methyl-5-(3,4-diaminophenyl)benzimidazole | (1) 3,3′,4,4′-tetraaminobiphenyl<br>(2) Heating |
| 17 2-methyl-6-carboxybenzothiazole | (1) 4-amino-3-mercaptobenzoic acid<br>(2) Heating |
| 18 2-(1-methylvinyl)-1,3,4-oxadiazole | (1) H₂NNHCOC(CH₃)=CH₂<br>(2) Dehydration |
| 19 —CO₂CH₂C(CH₃)₂CH₂OH | HOCH₂C(CH₃)₂CH₂OH |
| 20 —CO₂CH₂CH(OH)CH₃ | CH₃CH(O)CH₂ (propylene oxide) |
| 21 —CO₂CH₂CH=CH₂ | CH₂=CHCH₂OH |
| 22 —CN | (1) NH₃<br>(2) Dehydration |

| $A_q-T_k$ in formula (IV) (q = 1; k = 1) | Reactant/reaction conditions |
|---|---|
| 23 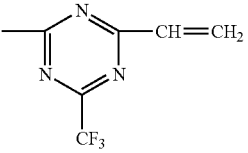 | (1) $NH_3$<br>(2) Dehydration<br>(3) <br>(4) $(CH_2{=}CHCO)_2O$ |
| 24 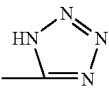 | Compound 22 + $NH_3$ |
| 25 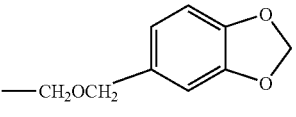 | (1) $LiAlH_4$<br>(2) 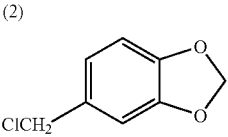 |
| 26  | (1) $LiAlH_4$<br>(2) Epibromohydrin |
| 27 —$CH_2$—O—$CH_2CH{=}CH_2$ | (1) $LiAlH_4$<br>(2) $CH_2{=}CHCH_2Br$ |
| 28 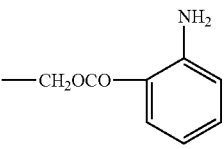 | (1) $LiAlH_4$<br>(2) 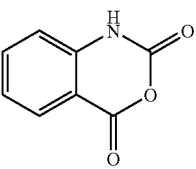 |
| 29 —$CH_2OSO_2F$ | (1) $LiAlH_4$<br>(2) $CF_3SO_2F + (C_2H_5)_3N$ |
| 30 —$CH_2OCN$ | (1) $LiAlH_4$<br>(2) $NCCl + (C_2H_5)_3N$ |
| 31 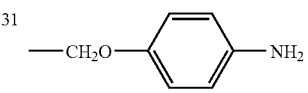 | (1) Compound 29<br>+ NaO  $NO_2$<br>(2) $H_2$ |
| 32 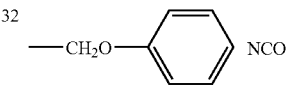 | Compound 31 + phosgene |
| 33 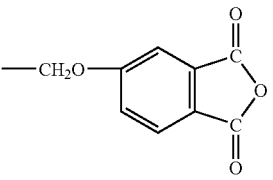 | (1) Compound 29<br>+ NaO 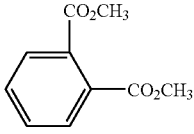<br>(2) Hydrolysis<br>(3) Acetic anhydride |

-continued

| $A_q$–$T_k$ in formula (IV) (q = 1; k = 1) | Reactant/reaction conditions |
|---|---|
| 34 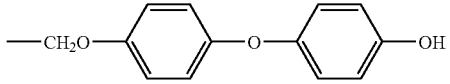 | (1) Compound 29 + 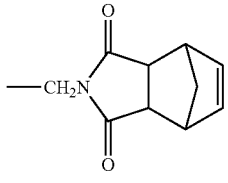 (2) ClCN + triethylamine |
| 35 —C(NH$_2$)=NH | Compound 22 + NH$_3$ |
| 36 —CH$_2$NCO | (1) Compound 29 + NH$_3$ (2) COCl$_2$ |
| 37 —CH$_2$NHCH$_3$ | Compound 29 + CH$_3$NH$_2$ |
| 38 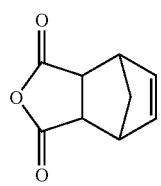 | (1) Compound 29 + NH$_3$ (2) 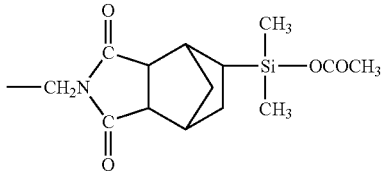 |
| 39 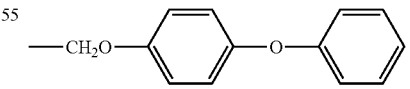 | Compound 38 + HSi (CH$_3$)$_2$OCOCH$_3$ + H$_2$PtCl$_6$ |
| 40 —CH$_2$OCOC(CH$_3$)=CH$_2$ | (1) LiAlH$_4$ (2) CH$_2$=C(CH$_3$)COCl |
| 41 —CH$_2$I | Compound 29 + NaI |
| 42 —CH$_2$SH | (1) Compound 29 + CH$_3$COSNa (2) Hydrolysis |
| 43 —CH$_3$N$^+$≡C$^-$ | (1) Compound 29 + NH$_3$ (2) HCO$_2$CH$_3$ (3) COCl$_2$ + (C$_2$H$_5$)$_3$N |
| 44 —NCO | (1) NaN$_3$ (2) Heating |
| 45 —COC$_6$H$_5$ | Cd(C$_6$H$_5$)$_2$ |
| 46 —C(CH$_3$)$_2$OH | (1) CH$_3$MgBr (2) H$^+$ |
| 47 —CHO | LiAlH$_4$ |
| 48 —C(CH$_3$)=CH$_2$ | Compound 46 + P$_2$O$_5$ |
| 49 —CH$_2$N(CN)CH$_3$ | Compound 37 + ClCN + (C$_2$H$_5$)$_3$N |
| 50 —I | (1) Ag$_2$O (2) I$_2$ |
| 51 —CH=CH$_2$ | Compound 47 + CH$_2$=P(C$_6$H$_5$)$_3$ |
| 52 —C(OCH$_3$)=NH | Compound 22 + CH$_2$OH + (C$_2$H$_5$)$_3$N |
| 53 —CH$_2$SO$_2$Cl | Compound 42 + Cl$_2$ + H$_2$O |
| 54 —CH(OCH$_3$)$_2$ | Compound 47 + CH$_3$OH + acid |
| 55 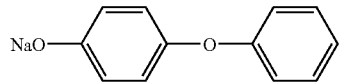 | |

-continued

| $A_q$–$T_k$ in formula (IV)<br>(q = 1; k = 1) | Reactant/reaction<br>conditions |
|---|---|
| Compound 29 + 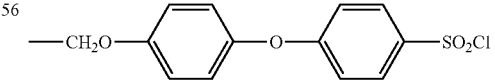 | Compound 55 + ClSO$_3$H |

The compounds obtainable from the peroxidic perfluoropolyethers of formula (I) by elimination of the peroxidic bridges have, as said, formula (III) or (IV),. These products have functionality F=2. This represents a remarkable advantage since it allows to obtain polycondensation polymers, for example polyamide and polyesters, having the desired mechanical properties since the polymerization can proceed until obtaining the desired molecular weights.

In fact it is well known that the commercially products of this class in the market generally consist of mixtures of monofunctional and bifunctional species, optionally containing also lower amounts of non functional species. The average functionality F of the mixture can be determined for example by $^{19}$F-NMR and it is generally between 1.90 and, at most, 1.98 (functional end groups per molecule). In particular, for example, in the compound commercially known as FOMBLIN® Z DOL having the following structure:

$$HOCH_2CF_2O(CF_2CF_2O)_{a'}(CF_2O)_{b'}(CF_2(CF_2)_z CF_2O)_{c'}CF_2CH_2OH$$

with a'/b'=0.5-1.5,the units with index c' are present in an amount of the order of 1% by weight, z has the above meaning, the content in bifunctional species is about 90-95%, the remaining species being constituted by monofunctional or non functional perfluoropolyoxyalkylenes. The perfluoropolyoxyalkylene diol can be used as macromonomer for preparing both thermoplastic, linear and crosslinked polyurethane, polyester and polyether copolymers. In case of linear-polymers the presence of monofunctional species in the monomeric mixture prevents to reach high molecular weights, thus with the worsening of mechanical properties of the end product. For crosslinked polymers the presence of monofunctional species determines an irregular formation of the tridimensional reticule, with worsening of chemical and mechanical resistance of the end product. This occurs when the functionality is lower than 2. It is therefore of great industrial interest to have available monomers and macromonomers having a functionality 2, as those of formula (III) of the present invention.

As said, the perfluoropolyether derivatives of formula (IV) have F=2. The compounds of formula (IV) wherein the end group is not reactive, can be used as internal and external lubricants in magnetic discs. These compounds show improved properties compared with the lubricants marketed by the Applicant, as for example Fomblin® AM 2001 and AM 3001, wherein the functionality F is lower than 2. As a matter of fact in said commercial products the bifunctional compound is in admixture with monofunctional and neutral compounds. The separation of the bifunctional compounds from those monofunctional in these products is not feasible.

Besides the perfluoropolyethers obtainable by elimination of the peroxide from the perfluoropolyethers of formula (I), for example by thermal treatment, and after fluorination of the functional end groups, are completely free from chlorine and contain only perfluoroalkyl end groups. Said compounds are usable as fluids for optical applications, since they show a low aborption of UV radiation at wave lengths lower than 250 nm.

By treating the compounds of formula (I) with alkaline metal fluorides, for example KF, at temperatures from 50° C. up to 200° C., optionally in the presence of solvents inert in the reaction environment, peroxidic perfluoropolyethers are obtained with functionality F=2 having formula:

$$X_3\text{—}O(CF_2O)_{n1}(CF_2CF_2O)_{m1}(CF_2(CF_2)_z CF_2O)_{p1}(O)_h\text{—}X_3 \quad (IA).$$

wherein:

$X_3$=—CF$_2$COF;

n1, m1, p1 and h are integers such that the number average molecular weight is in the range 700-100,000, preferably 1,500-40,000;

z=1 or 2;

with the proviso that:
the m1/n1 ratio is between 0.2 and 10;
the p1/(n1+m1) ratio is lower than 0.05;
the h/(n1+m1+p1) ratio is such that the PO content, defined as grams of active oxygen/100 g of product, is between 0.8 and 4.5, preferably between 1.4 and 3.8;

the perfluorooxyalkylene units being statistically distributed along the polymeric chain.

The chemical reduction of the compounds of formula (IA) can be carried out according to known processes as, for example, described for the compounds of formula (I), obtaining the perfluoropolyoxyalkylenes of formula (III).

The peroxidic pefluoropolyethers of formula (IA) find the same applications as the peroxidic perfluoropolyethers of formula (I).

The following Examples illustrate with non limitative purposes the present invention.

EXAMPLES

Analytical Methods

Method of Determination of the Peroxide Content (PO)

The analysis of the peroxide content is carried out according to the following method: a weighed polymer amount (some grams) is dissolved in about 20 ml of Galden ZT 180, 1 ml of acetic acid and 30 ml of a sodium iodide solution at 5% in isopropyl alcohol are added. It is put under strong stirring for 15 minutes and the developed iodine is titred with an aqueous solution of sodium thiosulphate with a known titre, using a potentiometric titration instrument Mettler DL40 equipped with platinum electrode and reference electrode.

The peroxide content (PO) is expressed in grams of active oxygen (MW=16) per 100 grams of polymer.

Determination of the Kinematic Viscosity

The kinematic viscosity measurements have been carried out with Cannon-Fenske type viscometers, previously calibrated at 20° C. The values are expressed in cSt.

Determination of the Molecular Weight and of the End Groups by $^{19}$F-NMR

The number average molecular weight and the relative percentages of the various end groups have been determined by $^{19}$F-NMR spectroscopy, by using an instrument working at a 400 MHz frequency.

The spectrum allows to differentiate the signals due to the fluorine atoms bound to the chain end groups and to the repeating units present in the polymeric chain. From the ratio between the integrals of the fluorine atoms of the end groups and of the chain units the number average molecular weight is calculated; from the integrals of the various end groups the relative percentages of the same end groups are obtained.

Calculation of the Functionality F of the Compound

On the basis of the results of the $^{19}$F NMR analysis the functionality F is calculated from the following ratio:

$$F = 2 \times \frac{\text{amount of functional end groups}}{\text{amount of total end groups}}$$

Example 1

Synthesis of the Peroxidic Perfluoropolyether

A 500 cc cylindrical photochemical reactor is used, equipped inside with coaxial quartz sheath wherein a high pressure mercury lamp (Hanau TQ 150) is inserted; it is cooled by a circulating fluid (Galden® D100) transparent to UV radiations emitted by the lamp, equipped furthermore with a condenser maintained at −75° C. and with feeding lines of the reacting gases.

The reactor is cooled to −40° C. by an external bath and charged with 800 g of 2-hydroheptafluoropropane (R 227 ea). One starts then to feed 12.0 Nl/h of oxygen and immediately after the UV lamp is switched on. Then 6.0 Nl/h of tetrafluoroethylene are fed in admixture with 0.12 Nl/h of $CF_2=CFCOF$ (perfluoroacryloyl fluoride); the reactant flow rates are maintained constant for the whole duration of the test (120 minutes), maintaining the reactor temperature at −40° C.

When the reaction is over the reactant feeding is interrupted, the UV lamp is switched off and the solvent and the gaseous by-products are let evaporate. The remained compound, after degassing, weighs 20 g and has a peroxidic content (PO), determined by iodometric analysis, equal to 2.9 g of active oxygen/100 g of polymer and a kinematic viscosity of 160 cSt. The $^{19}$F-NMR analysis confirms the following structure:

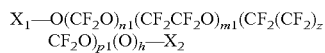

wherein the end groups —$X_1$ and —$X_2$, equal to or different from each other, are —$CF_2COF$ and —COF; the number average molecular weight is 2,900; h/(n1+m1+p1)=0.183; p1/(m1+n1)=0.02; m1/n1=0.98; z=1 or 2. No units are found in the chain deriving from PFAF.

The functionality F of the compound is equal to 2.

Example 2

Chemical Reduction of the Peroxidic Perfluoropolyether 10 g of the compound obtained in the Example 1 are diluted in 40 ml of $CF_2ClCFCl_2$ and introduced in a flask equipped with mechanical stirrer, condenser, dropping funnel and thermometer. 20 ml of $CH_3OH$ are added to the solution, it is put under stirring and the flask is heated with an external bath to 45° C. 10 ml of an aqueous solution of HI at 57% by weight are gradually added by the dropping funnel. When the dropping is over the mixture is maintained for two hours under stirring at 45° C.

The mixture is then transferred in a separatory funnel, the lower phase is separated and washed with a solution 0.01 N of sodium thiosulphate to remove the residual iodine. After the solvent evaporation 6.8 g of a compound are obtained, which at the $^{19}$F-NMR analysis shows to have the following structure:

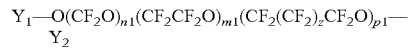

wherein $Y_1$ and $Y_2$, equal to or different from each other, are functional end groups of the —$CF_2COOCH_3$ and —$CF_2COOH$ type; the m1/n1 ratio=0.81; p1/(m1+n1)=0.02; z=1 or 2; the number average molecular weight is 490.

The functionality F of the compound is equal to 2.

Example 3 (Comparative)

Synthesis of the Peroxidic Perfluoropolyether

The synthesis described in the Example 1 is repeated without adding the perfluoroacryloyl fluoride comonomer and by using as solvent dichlorodifluoromethane (R12) in the amount of 720 g.

17 g of compound are obtained, after degassing of the reaction mixture. The peroxidic content (PO) is equal to 2.0 g of active oxygen/100 g of polymer. The kinematic viscosity is 160 cSt.

The $^{19}$F-NMR analysis confirms the following structure:

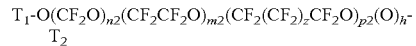

wherein the end groups -$T_1$ and -$T_2$, equal to or different from each other, are —$CF_2Cl$ (35% by moles), —$CF_2CF_2Cl$ (25% by moles), —$CF_3$ (5% by moles), —$CF_2COF$ (15% by moles), —COF (20% by moles); the number average molecular weight is 6,500; h/(n2+m2+p2)=0.117, m2/n2=0.85; p2/(n2+m2)=0.025, z=1 or 2.

The functionality F is 0.70.

Example 4 (Comparative)

Chemical Reduction of the Peroxidic Perfluoropolyether 10 g of the compound obtained in the previous Example are diluted in 40 ml of $CF_2ClCFCl_2$ and introduced in a flask equipped with mechanical stirrer, condenser, dropping funnel and thermometer. 20 ml of $CH_3OH$ are added to the solution, it is put under stirring and the flask is heated by an external bath to 45° C. By the dropping funnel 12 ml of an aqueous solution of HI at 57% by weight are gradually added. Then the mixture is maintained for two hours under stirring at 45° C.

The mixture is then transferred in a separatory funnel, the lower phase is separated and washed with a solution 0.01 N of sodium thiosulphate to remove the residual iodine.

After the solvent evaporation 7.5 g of a compound are obtained, which at the $^{19}$F-NMR analysis shows to have the following structure:

$$T3-O(CF_2O)_{n3}(CF_2CF_2O)_{m3}(CF_2(CF_2)_zCF_2O)_{p3}-T4$$

wherein the end groups T3 and T4, equal to or different from each other, are —$CF_2COOCH_3$ and —$CF_2COOH$, —$CF_2Cl$, —$CF_2CF_2Cl$, —$CF_3$. m3/n3=0.61; p3/(n3+m3)=0.02; z=1 or 2; the number average molecular weight is 760.

The functionality F of the compound is 1.87.

The invention claimed is:

1. A process for preparing peroxidic perfluoropolyethers of formula:

$$X_1-O(CF_2O)_{n1}(CF_2CF_2O)_{m1}(CF_2(CF_2)_zCF_2O)_{p1}(O)_h-X_2 \quad (I)$$

wherein:

$X_1$ and $X_2$, equal to or different from each other, are chain end groups selected between —$CF_2COF$ and —COF;

n1, m1, p1 and h are integers such that the number average molecular weight is in the range 700-100,000;

z=1 or 2;

with the proviso that:

the m1/n1 ratio is between 0.2 and 10;

the p1/(n1+m1) ratio is lower than 0.05;

the h/(n1+m1+p1) ratio is such that the PO content, defined as grams of active oxygen/100 g of compound, is in the range 0.8-4.5;

the perfluorooxyalkylene units being statistically distributed along the polymeric chain;

said process carried out by photooxidation, in the presence of $CF_2=CFCOF$ (perfluoroacryloyl fluoride, PFAF), of tetrafluoroethylene (TFE) in the presence of UV light having wave length between 200 and 350 nm, at a temperature in the range from −30° C. to −100° C., by using solvents, liquid under the reaction conditions, selected from perfluorocarbons and (mono)hydrofluorocarbons, having the following general formula:

$$C_yF_{(2y+2-x)}H_x \quad (II)$$

wherein y is an integer from 2 to 4; x is an integer equal to 0 or 1;

or related mixtures.

2. A process according to claim 1 carried out in a semicontinuous or continuous way, by feeding in the reaction solvent TFE and oxygen in molar excess with respect to TFE, and by contemporaneously feeding PFAF, at the gaseous or liquid state, the molar ratio PFAF/TFE being between 0.001 and 0.07, extremes included.

3. A process according to claim 1, wherein the solvents of formula (II) are selected from the following: perfluoropropane ($C_3F_8$), hydropentafluoroethane ($C_2F_5H$) and 2-hydroheptafluoropropane ($CF_3CFHCF_3$), or related mixtures.

4. A process according to claim 1, wherein n1, m1, p1 and h are integers such that the number average molecular weight is in the range of 1,500-40,000.

5. A process according to claim 1, wherein the h/(n1+m1+p1) ratio is such that the PO content, defined as grams of active oxygen/100 g of compound, is in the range of 1.4-3.8.

6. A process according to claim 2, wherein said molar excess if from 1.1 to 3.

7. A process according to claim 2, wherein the molar ratio PFAF/TFE is between 0.008 to 0.05, extremes included.

* * * * *